United States Patent

[11] 3,607,913

[72] Inventor Jerome M. Lavanish
Akron, Ohio
[21] Appl. No. 732,861
[22] Filed May 29, 1968
[45] Patented Sept. 21, 1971
[73] Assignee PPG Industries, Inc.
Pittsburgh, Pa.

[54] PREPARATION OF TRICHLOROVINYL DICHLOROACETATE
8 Claims, No Drawings

[52] U.S. Cl............................................................ 260/487,
260/89.5 A, 260/91.1 R, 260/92.8 R, 260/465.9
[51] Int. Cl........................................................C07c 69/62,
C08f 1/82, C07c 121/32
[50] Field of Search............................................ 260/487

[56] References Cited
UNITED STATES PATENTS
3,410,892  11/1968  Martin............................ 260/487
2,630,453  3/1953  Gluesenkamp et al. ...... 260/487

OTHER REFERENCES

Geger et al. Chem. Abstracts Vol. 69 (1968) 86305m Brody & Rae Tetrahydron Letters 16 pp. 1977- 1980 1968
Brody et al. J. Arg. Chem. Vol. 31, 1966 pp. 626- 628

Primary Examiner—Lewis Gotts
Assistant Examiner—Jacqueline L. Davison
Attorney—Chisholm and Spencer

ABSTRACT: Trichlorovinyl dichloroacetate is prepared by reacting a tertiary amine with an excess of dichloroacetyl chloride. Preferably, the reaction is conducted in the presence of an inert diluent.

PREPARATION OF TRICHLOROVINYL DICHLOROACETATE

BACKGROUND OF THE INVENTION

The preparation of alpha, alpha-dihalocyclobutanones by the cycloaddition of dihaloketene with an olefin has been described in Canadian Pat. No. 740,941. In said patent, dihaloketenes are generated in situ by the reaction of substantially equal molar quantities of a tertiary amine and a dihaloacetyl halide.

BRIEF SUMMARY OF THE INVENTION

It has now been discovered that a new compound, trichlorovinyl dichloroacetate, can be prepared by admixing a stoichiometric excess of dichloroacetyl chloride with a tertiary amine. Preferably, the reaction is conducted in the presence of an inert diluent and at ambient temperatures.

DETAILED DESCRIPTION

Any tertiary amine that is free of other functional groups which react with dichloroacetyl chloride can be used in the present process. Examples of such other reactive functional groups include, for example, —OH, —SH, —$CO_2H$, —NH, —$SO_2H$, and —$SO_3H$. When the preparation of trichlorovinyl dichloroacetate is conducted in the presence of a diluent, the tertiary amine is preferably soluble in the diluent selected. Moreover, it is preferred that the tertiary amine forms a hydrohalide which is relatively insoluble in the diluent. Although simple aliphatic tertiary amines are most preferred, any suitable tertiary amine (as defined above) can be employed. Thus, ditertiary amines, such as tetramethyldiaminoethane, and cyclic amines, such as pyridine and derivatives thereof, can also be employed.

Aliphatic tertiary amines which suitably can be employed in the present process can be depicted by the following formula:

$$R-N(R')-R'' \quad (1)$$

wherein R, R' and R'' are each selected from the group consisting of $C_1$–$C_{10}$ alkyl, preferably $C_1$–$C_5$ alkyl.

Suitable examples of various tertiary amines include: trimethylamine, triethylamine, tri-n-propylamine, tri-n-butylamine, tri-n-octylamine, methyldiethylamine, methylethyl-n-propylamine, triisopropylamine, dimethylisopropylamine, dimethylbutylamine, dimethylisoamylamine, dimethylisooctylamine, dimethyloctylamine, methylethylisooctylamine, dimethyl-(2-ethyl)-propylamine, dimethyl-t-butylamine, dimethyloctadecylamine, pyridine, lutidine, piperidine, collidine, picoline, N-methylmorpholine, N-methylpiperidine, N,N'-dimethylipiperazine, quinoline, dimethylaniline, and dimethylaminoethylpropionate. Preferably, the simple tertiary aliphatic amines, such as triethylamine, are used.

Dichloroacetyl chloride used in the present process is commercially available and can be prepared by chlorination of acetic acid in the presence of phosphorus trichloride.

The amount of dichloroacetyl chloride used in the present process is in stoichiometric excess based on the amount of tertiary amine. The greater the excess of dichloroacetyl chloride, the better the yield of trichlorovinyl dichloroacetate. Preferably, the mole ratio of dichloroacetyl chloride to tertiary amine is at least about 1.5:1 and preferably is at least 2:1. Mole ratios in excess of about 5:1 do not increase the yield appreciably and, therefore, are not ordinarily used.

The preparation of trichlorovinyl dichloroacetate in accordance with the present described process is preferably conducted in the presence of a chemically inert diluent because of the formation of insoluble tertiary amine hydrohalides. The formation of solids within the reaction medium makes stirring difficult and, therefore, the use of a chemically inert diluent serves to dilute the reactants and reaction products and allow for more easy separation of the desired product. Preferably, the chemically inert diluent is also anhydrous since dichloroacetyl chloride will react with water and thereby reduce the yield of product. In addition, it is preferred that the inert diluent is also a nonsolvent for the tertiary amine hydrohalide formed as a byproduct of the reaction. To be considered inert, a solvent should contain no functional groups that react with the tertiary amine or dichloroacetyl chloride reactants, and with the trichlorovinyl dichloroacetate product. Unsuitable solvents are those containing hydroxyl and/or carboxyl groups or an active hydrogen, i.e., a hydrogen attached to an oxygen, sulfur or nitrogen atom. The amount of solvent employed can vary over a wide range; but, typically should be about three times as great by weight as the tertiary amine hydrohalide byproduct in order to facilitate agitation of the reaction medium.

Examples of suitable solvents include: $C_4$–$C_{20}$ aliphatic hydrocarbons, and chlorinated aliphatic hydrocarbons, $C_4$–$C_{12}$ alicyclics, $C_6$–$C_{10}$ aromatics, and chlorinated aromatics, ethers and esters. Specific examples of the above include: n-butane, isobutane, pentane, hexane, isopentane, n-heptane, 2,2,3-trimethylbutane, n-octane, dodecane, pentadecane, eicosane, preferably, pentane and hexane; cyclobutane, methylcyclopropane, cyclopentane, cyclohexane, cyclododecane; benzene, toluene, o-xylene, m-xylene, p-xylene, ethylbenzene, n-propylbenzene, isopropylbenzene, p-isopropyl-toluene, 1,2,3-trimethylbenzene, 1,3,5-trimethylbenzene, tetrahydronaphthalene, decahydronaphthalene, 1,4-dioxane, 1,3-dioxane, 1,3-dioxolane, tetrahydrofuran, 2-methyltetrahydrofuran, methylpropylether, di-n-propylether, di-n-butylether, diiso-propylether, ethyl-n-butylether, diethylether; $C_1$–$C_4$ alkyl esters of $C_1$–$C_8$ carboxylic acids, such as methylacetate, propylacetate, butylacetate, ethylpropionate, methylbutyrate, methyl heptanoate, ethyl benzoate, dimethyl phthalate; carbon tetrachloride, chloroform, perchloroethylene, dichlorodifluoromethane, trichloroethylene, methylene chloride, 1,1,1-trichloroethane, 1,2-dichloroethane, o-dichlorobenzene, hexafluorobenzene, monochlorobenzene, and 1,2,4-trichlorobenzene.

In conducting the present described process, it is also advantageous to provide an unreactive, e.g., anhydrous, atmosphere over the reaction medium because of the reactivity of dichloroacetyl chloride with moisture. Typically, unreactive atmospheres can be provided by the use of dry, inert gases such as nitrogen, helium or argon.

The admixing of dichloroacetyl chloride and tertiary amine is advantageously conducted by adding the tertiary amine to the dichloroacetyl chloride; however, both can be added simultaneously to a suitable reaction vessel. Preferably, the tertiary amine is added to a stoichiometric excess of dichloroacetyl chloride.

The temperature at which trichlorovinyl dichloroacetate is prepared by the present process can vary over a wide range and typically will depend to a great extent on the diluent employed. Generally, temperatures above —50 ° C. up to the boiling point of the reaction medium, e.g., 100 ° C., are employed. Usually, however, temperatures between about —20 ° C. and about 50 ° C. are utilized. Typically, temperatures in the range of between about 0 ° C. and about 30 ° C. are used, e.g., room temperatures, i.e., about 25 ° C., have been found especially suitable.

The pressure at which the present process can be performed will depend to a great extent upon the volatility of the diluent and the reactants employed. In general, the reaction can be conducted at normal atmospheric pressure. In the event that one or more of the reactants and/or diluent have low boiling points, superatmospheric pressures can be employed, e.g., between about 1 and about 3 atmospheres. If desired, pressures less than atmospheric can be utilized so long as the reactants remain in the liquid state.

Trichlorovinyl dichloroacetate prepared in the above-described manner can be separated easily from the reaction medium by filtering the contents of the reaction vessel to eliminate solids; concentrating the filtrate; and distilling the resulting concentrate. Conveniently, vacuum distillation is used for the last step.

Trichlorovinyl dichloroacetate is a water-white liquid having a boiling point of 67 ° C. at 0.9 millimeters of mercury. An infra-red spectrum of the compound exhibits maxima at 3007 $cm.^{-1}$ (C–H bond), 1790 $cm.^{-1}$ (vinyl ester carbonyl) and 1610 $cm.^{-1}$ (C=C). A nuclear magnetic resonance spectrum of the compound exhibited a single peak at 6.15 p.p.m.

Trichlorovinyl dichloroacetate has been found to retard the polymerization of vinyl compounds, e.g., vinyl chloride monomer. By incorporating retarding amounts of trichlorovinyl dichloroacetate into vinyl compounds, stabilization of the compound during storage and transit is accomplished. Moreover, the compound is easily removed from the vinyl monomer prior to its polymerization by washing with an aqueous or caustic aqueous solution or by distillation. In the case of emulsion of other aqueous polymerization systems, the step of removing trichlorovinyl dichloroacetate from the vinyl compound can be eliminated because of its reactivity with water. Typically, from 1 to about 10 percent by weight, based on vinyl monomer, of trichlorovinyl dichloroacetate is sufficient to inhibit the polymerization of the monomer. Usually about 5 weight percent is employed.

In addition to vinyl chloride, trichlorovinyl dichloroacetate can be employed to retard the polymerizaton of free radical initiated polymerizations, e.g., the polymerization of vinyl compounds such as vinyl acetate and similar esters, styrene, acrylic acid esters, such as methyl acrylate, and methyl methacrylate, acrylonitrile, and vinyl ethers, such as vinyl ethyl ether.

The present process and the compound produced thereby are more particularly described in the following examples which are intended as illustrative only since numerous modifications and variations therein will be apparent to those skilled in the art.

EXAMPLE I

A solution of 10.1 grams (0.10 mole) of triethylamine in 50 milliliters of dry ether was added over a period of 30 minutes to a stirred solution of 32.4 grams (0.22 mole) of dichloroacetyl chloride in 100 milliliters of dry ether. The addition was performed at room temperature (about 20 ° C. ) under a nitrogen atmosphere and the resulting tan slurry stirred for 3 hours. The slurry was then filtered and the filter cake washed with two 50-milliliter portions of ether. The combined filtrate and wash solutions were concentrated under vacuum to an amber-colored liquid that weighed 23.2 grams. Vacuum distillation with a 6 inch Vigreaux column gave 8.1 grams of water-white liquid (boiling point 67 ° C. at 0.9 mm. Hg.). Analysis of the white liquid by infra-red and nuclear magnetic resonance spectra, as well as carbon, hydrogen, oxygen and chlorine analyses were consistent with the compound trichlorovinyl dichloroacetate. Elemental analysis of the compound was as follows: Calculated for $C_4HCl_5O_2$: C, 18.6; H, 0.4; Cl, 68.7. Found: C, 18.6; H, 0.5; Cl, 67.3. Osmometric molecular weight of the water-white liquid was found to be 269 (Calculated 258). The distillation residue was found to be comprised of polymer derived from dichloroketene.

Identification of the water-white liquid product was further confirmed by ethanolysis of the product. Dissolution of 0.8 grams of the product in one milliliter of absolute ethanol followed by removal of the volatile components under vacuum gave a colorless liquid with an infra-red spectrum superimposable on that of an authentic sample of ethyl dichloroacetate.

EXAMPLE II

A suitable 28-ounce polymerization bottle was charged with 47.5 grams of vinyl chloride, 2.5 grams of trichlorovinyl dichloroacetate and 0.015 grams of isopropyl peroxydicarbonate as a 5 percent toluene solution. The polymerization bottle was capped and weighed prior to placing it in an Ashworth-McDade polymerizer. The bottle was tumbled at 29 revolutions per minute at 50 ° C. for 48 hours. After 48 hours, the bottle was vented to the atmosphere to eliminate unreacted vinyl chloride monomer. The bottle was reweighed and found to contain 10 grams of unrefined polymer. This weight included trichlorovinyl dichloroacetate incorporated into the polymer by copolymerization with vinyl chloride.

The aforementioned procedure was repeated and 9 grams of unrefined polymer was found in the polymerization bottle.

EXAMPLE III

The procedure of Example II was substantially repeated but without utilizing trichlorovinyl dichloroacetate as a polymerization retarder. In two typical polymerizations, 46 and 49 grams of polymer were obtained which correspond to 96 and 98 percent conversions respectively.

Comparing the results of Example II with the present example, it is discernible readily that the presence of trichlorovinyl dichloroacetate during vinyl chloride polymerizations drastically retards such polymerization reaction by forming a copolymer at a much slower rate than vinyl chloride polymer in the absence of the retarder.

EXAMPLE IV

The procedures of Examples II and III are repeated successively with vinyl acetate, styrene, methyl acrylate, acrylonitrile and vinylethyl ether and in each case, trichlorovinyl dichloroacetate retards the polymerization of the named vinyl monomer.

While there are above described a number of specific embodiments of the present invention, it is obviously possible to produce other embodiments and various equivalent modifications thereof without departing from the spirit of the present invention.

Having set forth the general nature and specific embodiments of the present invention, the true scope is now more particularly pointed out in the appended claims.

I claim:
1. Trichlorovinyl dichloroacetate.
2. A method of preparing trichlorovinyl dichloroacetate which comprises admixing a tertiary amine with a stoichiometric excess of dichloroacetyl chloride.
3. A method according to claim 2 wherein the molar quantity of dichloroacetyl chloride is at least 1.5 times that of the tertiary amine.
4. A method according to claim 2 wherein the tertiary amine is an aliphatic tertiary amine.
5. A method according to claim 4 wherein the tertiary amine is triethylamine.
6. A method according to claim 2 wherein an inert diluent is present.
7. A method according to claim 2 wherein admixing takes place under an inert atmosphere.
8. A method according to claim 2 wherein the temperature of admixing is within the range of from 0 ° to 30 ° C.